United States Patent
Behunin (10) Patent No.: US 10,506,051 B2
(45) Date of Patent: *Dec. 10, 2019

(54) REMOTE SYSTEM MONITOR

(71) Applicant: Experian Health, Inc., Franklin, TN (US)

(72) Inventor: Romie Behunin, Amarillo, TX (US)

(73) Assignee: EXPERIAN HEALTH, INC., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/180,792

(22) Filed: Nov. 5, 2018

(65) Prior Publication Data

US 2019/0075169 A1   Mar. 7, 2019

Related U.S. Application Data

(63) Continuation of application No. 15/083,932, filed on Mar. 29, 2016, now Pat. No. 10,122,799.

(51) Int. Cl.
| | |
|---|---|
| *G06F 13/00* | (2006.01) |
| *H04L 29/08* | (2006.01) |
| *H04L 12/26* | (2006.01) |
| *H04L 29/06* | (2006.01) |
| *G06F 9/451* | (2018.01) |

(52) U.S. Cl.
CPC ........ *H04L 67/142* (2013.01); *H04L 43/0876* (2013.01); *H04L 63/0815* (2013.01); *H04L 67/14* (2013.01); *G06F 9/452* (2018.02)

(58) Field of Classification Search
CPC ............... H04L 43/0876; H04L 67/142; H04L 63/0815; H04L 67/148; H04L 29/08639; H04L 67/14; G06F 9/452

USPC .......... 709/227–229, 220–222, 224
See application file for complete search history.

(56) References Cited

U.S. PATENT DOCUMENTS

| | | |
|---|---|---|
| 3,795,800 A | 3/1974 | Nimmo et al. |
| 5,621,892 A | 4/1997 | Cook |
| 5,754,752 A | 5/1998 | Sheh et al. |
| 5,819,019 A | 10/1998 | Nelson |
| 6,178,529 B1 | 1/2001 | Short et al. |
| 6,279,826 B1 | 8/2001 | Gill et al. |
| 6,594,774 B1 | 7/2003 | Chapman et al. |
| 7,080,404 B2 | 7/2006 | Abdo et al. |
| 7,117,390 B1 | 10/2006 | Klarer et al. |

(Continued)

*Primary Examiner* — Kenneth R Coulter
(74) *Attorney, Agent, or Firm* — Merchant & Gould (57) ABSTRACT

Aspects described herein pertain to monitoring and automatic re-instantiation of a communication session using a monitoring system and/or device and one or more remote systems and/or devices. If a disruption in a communication session occurs, an automated reconnect agent executable can execute on one or more of the remote systems and/or devices to automatically re-instantiate the communication session without or absent requiring human intervention. For example, the automated reconnect agent executable can use automatic reconnect parameters to automatically re-instantiate a pre-existing communication session without or absent requiring a human operator to reenter login or other authentication credentials or engage in some other form of authorization or authentication in order to reestablish the communication session between a monitoring system and/or device and one or more remote systems and/or devices.

20 Claims, 6 Drawing Sheets

(56) References Cited

U.S. PATENT DOCUMENTS

| | | | |
|---|---|---|---|
| 7,117,393 B2 | 10/2006 | Baba et al. | |
| 7,389,341 B2 | 6/2008 | Cornelius et al. | |
| 7,475,421 B2 | 1/2009 | Abdo et al. | |
| 8,090,810 B1 | 1/2012 | Insley et al. | |
| 8,176,137 B2 | 5/2012 | Cornelius et al. | |
| 8,386,609 B2 | 2/2013 | Anand et al. | |
| 8,504,729 B2 * | 8/2013 | Pezzutti | H04L 41/065 379/93.02 |
| 9,130,903 B2 * | 9/2015 | Ryman | H04L 67/025 |
| 9,277,017 B2 * | 3/2016 | Burch | H04L 67/146 |
| 10,122,799 B2 * | 11/2018 | Behunin | H04L 67/142 |
| 2002/0116500 A1 * | 8/2002 | Arora | H04L 29/06 709/227 |
| 2003/0188195 A1 | 10/2003 | Abdo et al. | |
| 2005/0192971 A1 | 9/2005 | Tabbara et al. | |
| 2006/0200551 A1 | 9/2006 | Bali et al. | |
| 2007/0233455 A1 | 10/2007 | Zimmer et al. | |
| 2008/0162984 A1 | 7/2008 | Kalra et al. | |
| 2009/0125589 A1 | 5/2009 | Anand et al. | |
| 2011/0004680 A1 * | 1/2011 | Ryman | H04L 67/025 709/224 |
| 2014/0122730 A1 * | 5/2014 | Burch | H04L 67/146 709/228 |
| 2016/0205149 A1 * | 7/2016 | Burch | H04L 67/146 709/228 |
| 2017/0126812 A1 | 5/2017 | Singhal | |

* cited by examiner

REMOTE SYSTEM MONITOR

CROSS REFERENCE TO RELATED APPLICATION

This application is a continuation of application Ser. No. 15/083,932, filed Mar. 29, 2016, now U.S. Pat. No. 10,122,799, which application is incorporated herein by reference in its entirety.

BACKGROUND

At a high-level, a remote desktop communication protocol enables one computer platform to remotely control another computer platform that may be locally or remotely located. Operational bandwidth is consumed in order to instantiate each remote desktop session. In practice, the computer platforms and connections are susceptible to malfunctions as well as unreliable or intermittent network and/or power connections. For example, in many networked environments, and particularly with respect to the Internet, data connections can be unreliable and easily dropped.

Processing and memory resources may continue to be expended in order to maintain the connection once a remote desktop session has been established but for some reason is unable to support communications. Rather than terminating the remote desktop session, the remote desktop session may be kept active for a predefined time period, and a user can again log into the active session. If an established remote desktop session abnormally terminates, processing and memory resources are used in order to reconnect and/or start a new remote desktop session.

To begin the new remote desktop session, a user typically has to provide authentication credentials in order to connect to the new remote desktop session. Repeated retransmission of authentication credentials exposes the credentials to potential attacks and tends to be a slow and inefficient process. Moreover, if a client system/device is required to obtain a new network identifier (ID), the applications or programs on the client may need to be restarted because of the change.

BRIEF SUMMARY

The present disclosure describes aspects of providing monitoring and automatic re-instantiation of a communication session using a monitoring system and/or device and one or more remote systems and/or devices, but are not so limited. If a disruption in a communication session occurs, an automated reconnect agent executable of an embodiment can execute on one or more of the remote systems and/or devices to automatically re-instantiate the communication session without or absent requiring human intervention. For example, the automated reconnect agent executable can use automated reconnect parameters to automatically re-instantiate a pre-existing communication session without or absent requiring a human operator to reenter login or other authentication credentials or engage in some other form of authorization or authentication in order to reestablish the communication session between a monitoring system and/or device and one or more remote systems and/or devices.

This summary is provided to introduce a selection of concepts; it is not intended to identify all features or limit the scope of the claimed subject matter.

BRIEF DESCRIPTION OF THE DRAWINGS

The accompanying drawings, which are incorporated in and constitute a part of this disclosure, illustrate various aspects and examples of the present disclosure.

DETAILED DESCRIPTION

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, subtracting, and/or adding operations to the disclosed methods. Accordingly, the following detailed description does not limit the present disclosure, but instead, the proper scope of the present disclosure is defined by the appended claims. The following detailed description is, therefore, not to be taken in a limiting sense.

As described below, functionality is provided to enable systems/devices to automatically reconnect to and re-instantiate a pre-existing communication session (also referred to as a monitored session) after a disruption or other issue that may detrimentally affect communications. Upon or after a disruption in the communication session, an automated reconnect agent executable can be used to automatically reestablish the pre-existing communication session between the monitoring system and/or device and the one or more monitored systems and/or devices.

In today's computing environments, the ability to quickly bring a disabled or otherwise unavailable system, device, or component back to life and integrated with ongoing processing and/or communication activities helps to ensure that ongoing operations of the dependent system and/or device are not inordinately affected. For example, when a database server or application server malfunctions or loses power, systems/devices/components depending on the services of the database server or application server will need to pause operations or, if available, switch to a different database server or application server to begin a new communication session in order to continue processing transactions.

Even though a communication session has been disrupted, processing and memory resources may still be used for an allocated channel or connection. For example, a channel allocated to a monitored session may still be consuming processing resources, memory resources, and/or bandwidth via an open connection even though a monitored machine may be down or unreachable. Moreover, a channel allocated to a disrupted monitored session limits the number of channels that may be allocated or available for other clients, services, applications, programs, etc. By reconnecting the monitored session or discontinuing a monitored session, channels may be freed up and allocated more efficiently.

As described further below, a monitor machine or other device or system can transmit automated reconnect parameters, which are used by an automated reconnect agent executable executing on a monitored machine to automatically re-instantiate a pre-existing monitored session with the monitored machine or other networked device/system. Issues that may later arise after a session disruption may be preempted by employing the automated reconnect agent executable and/or automatic reconnect parameters at the start, before, or while setting up a communication session.

An embodiment of a monitor machine can be configured to perform polling operations and/or active logging of connection status between the monitor machine and any monitored machines. The monitor machine also can be configured to aggregate and tile all monitored sessions for simultaneous display on a screen or other computer display. The monitor machine also can be configured to use an electronic response string or other electronic transmission to log back into a monitored machine and reconnect to the monitored session without requiring a user to login again or otherwise re-authenticate. As described further below, one aspect uses at least one additional monitor machine to monitor a primary monitor machine as well as provide automatic failover options using the at least one additional or redundant monitor machine. Other embodiments and examples are described below.

Figure 1:
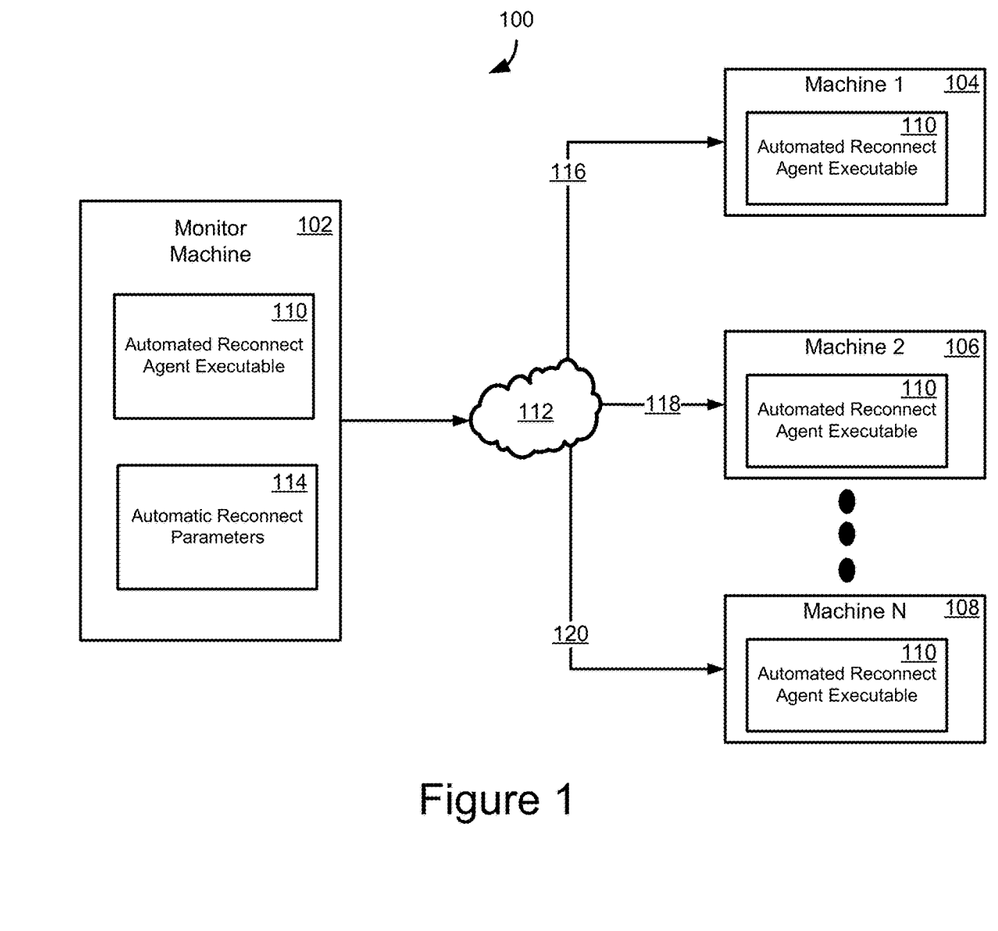
FIG. 1 is a block diagram that depicts a high-level view of a computer and communication system according to an embodiment.

FIG. 1 is a block diagram that depicts a high-level view of a computer and communication system 100 (system 100) according to an embodiment. It will be appreciated that modern complex computer and communication architectures include a variety of hardware, software, and/or firmware that provide networked communication functionality to devices, systems, applications, etc.

As used herein, the term "machine" refers to a physical article such as various endpoint systems and/or devices that use networked communication functionality to communicate and/or transfer data. Exemplary systems and/or devices may include a desktop or laptop computer, a tablet computer, a network access device, a memory storage device, etc. According to one functional implementation, a machine includes, but is not limited to having, a power supply, power control circuitry to control and regulate use of an external or internal power supply, processing and/or memory resources, such as a central processing unit, microprocessor, etc., advanced integrated circuitry, graphics processing hardware, networking hardware for wired and/or wireless configurations, an operating system, screen or display, I/O components, etc.

As shown by example in FIG. 1, the exemplary system 100 includes a monitor machine 102 and monitored machines 104, 106, and 108. It will be appreciated that the machines 102, 104, 106, and 108 may be physically located at the same and/or different locations and may include disparate hardware and/or software configurations. The automated reconnect agent executable 110 can be tailored according to the particular operating system of each platform.

According to an embodiment, the automated reconnect agent executable 110 is stored in memory or on a disk of each machine 102, 104, 106, and/or 108. The automated reconnect agent executable 110 can be configured with programmatic instructions that operate to automatically attempt to reconnect and/or re-instantiate a monitored session once a monitored machine is able to reestablish communication with network(s) 112 (e.g., comes back online). In one embodiment, the automated reconnect agent executable 110 executes after a reboot, restart, or other issue that disrupts a monitored session with a monitored machine by automatically reconnecting to the monitor machine 102 and re-instantiating the monitored session without or absent human intervention.

According to one embodiment, automatic reconnect functionality comprising programmatic software instructions for the automated reconnect agent executable 110 can be communicated to a monitored machine with or as part of a configuration file or configuration data as needed; such as when performing or preparing to perform some type of communicative transaction or transactions between endpoint systems and/or devices. The automated reconnect agent executable 110 can also be pre-loaded on each machine or accessed from a remote application server as needed.

As an implementation example, the monitor machine 102 can be used to monitor electronic transactions associated with a healthcare information system (HIS) or healthcare information exchange (HIE). Upon establishing a communication session via network(s) 112, a machine of the HIS or HIE can receive executable code and/or automated reconnect parameters from monitor machine 102 or a dedicated source (e.g., application server) before beginning or resuming communicative data transactions via an established communication channel.

In one embodiment, executable code used to impart the automatic reconnect functionality of the automated reconnect agent executable 110 can be executed in response to an electronic request for information from a remote machine. For example, the automated reconnect agent executable 110 can be triggered to execute as part of an electronic eligibility response (e.g., an X12 EDI-271 response) or some other electronic communication to an electronic eligibility request (e.g., an X12 EDI-270 request).

It will be appreciated that the executable code or programmatic instructions can be installed and/or embedded in memory or on disk of a monitored machine and used during the automatic reconnect and/or electronic notification process for a monitored session, as described below. Depending on the implementation preference, the automated reconnect agent executable 110 can also be stored at a remote storage location and downloaded to memory or disk as part of a background or other process to each monitored machine. Updates made to the automated reconnect agent executable 110 and/or parameters used in the automatic reconnect process also may be stored locally and/or remotely.

The automatic reconnect parameters of an embodiment include session-related and/or other connection information that enables a machine to use the automated reconnect agent executable 110 to automatically reconnect and/or re-instantiate a remote session after a disruption or other issue that affects session communications. The automatic reconnect parameters used to manage a communication session can be stored locally and/or remotely for access, use, and/or reuse.

As described herein, the automated reconnect agent executable 110 provides a mechanism to promote reliable communications to and/or from monitored machines. The automated reconnect agent executable 110 can be used to re-instantiate a communication session for a variety of reasons, such as when a monitored machine loses power, reboots, restarts, loses network connectivity (e.g., goes offline), or encounters some other technical issue that affects the ability to have a robust communication session.

As used herein, a monitored session refers to a communication session that includes at least one monitor machine 102 and/or at least one an automated reconnect agent executable 110. Once a monitored machine is unable to communicate across a channel of a monitored session, the automated reconnect agent executable 110 can be used to automatically restore the communication session for the monitored machine 102 without or absent requiring human intervention and/or additional authentication and/or authorization steps.

With continuing reference to FIG. 1, network(s) 112 can include a local area network (LAN) (e.g., a company Intranet), a wide area network (WAN) (e.g., the Internet or the World Wide Web), accessed via a variety of couplings or connections and/or protocols including, but not limited to, landlines, LAN or WAN links (e.g., 802.11, T1, T3, 56 kb, X.25, etc.), broadband connections (e.g., ISDN, Frame Relay, ATM, etc.), HTTP, ICA, TCP/IP, IPX/SPX, NetBIOS, Ethernet, RS232, direct asynchronous connections, wireless connections, etc.

As an implementation example, an IT administrator of a hospital may decide to locate a monitor machine 102 locally with other monitored machines, but connected to a separate power supply/source and isolated behind a firewall or other security barrier. The IT administrator could also decide to locate the monitor machine 102 at a location remote from machines to be monitored. For example, one monitoring implementation uses a dedicated desktop machine that uses an operating system and includes a power source, power control circuitry, processing and memory resources, network connection capability, and/or other capabilities and/or features to manage a monitored session.

Exemplary systems and/or devices include a workstation or terminal computer, a desktop computer, a server computer, a laptop computer, a tablet computer, other handheld computer types, mobile telephone, or other form of processing and/or telecommunications device/system capable of communication to perform the various automatic reconnect operations described herein. It is also possible to use the monitor machine 102 or another device that includes the automated reconnect agent executable 110 to monitor in the field mobile systems and/or devices, such as a mobile sample collector/analyzer used by a hospital to treat patients off-site.

The automated reconnect agent executable 110 of one embodiment can be installed on a machine with the installation of operating system software or as part of add-in functionality. The automated reconnect agent executable 110 of one embodiment uses automatic reconnect parameters that include, but are not limited to: a session name parameter corresponding to a name of a monitored session; a user name parameter corresponding to a name of one or more users associated with the monitored session; a session identifier (ID) parameter, to identify the monitored session; a server name parameter, to identify a session host (if used); a connect parameter, to track connection settings of the monitored session; a reconnect attempt count parameter, to track a number of reconnect attempts; and/or a state parameter, to track state information associated with the monitored session.

For example, the reconnect attempt count parameter can be used to determine when to disconnect from a monitored session and/or send an electronic notification regarding an inability to reconnect or reestablish a session. As another example, the state parameter can be populated based on one or more of a last completed transaction, an output from a power regulation circuit that has detected an issue with a power supply of a monitor machine, an output from a network interface circuit that has detected a connectivity issue, etc. The automatic reconnect parameters can be shared and/or sent to a session manager, monitored and/or monitoring machines, operating system components, etc.

As described further below, the monitor machine 102 of one embodiment can be configured to: simultaneously monitor and/or control a plurality of remote computer sessions (e.g., 2, 4, 6, N remote desktop protocol (RDP) sessions); configure monitoring parameters via a configuration file (e.g., XML); configure polling and active logging parameters regarding connection status of a monitored communication session; provide a tile option to simultaneously view and compare all connections; and/or automatically re-instantiate a pre-existing communication session.

According to an embodiment, when beginning a session, the monitor machine 102 can generate a configuration file that includes automatic reconnect parameters 114 used by a corresponding automated reconnect agent executable 110 to re-instantiate a monitored session. The configuration file of an embodiment includes one or more of the automatic reconnect parameters 114 and can be sent to each of the monitored machines either as an encrypted file or as a string in an electronic communication, such as an embedded string or embedded code in an electronic eligibility response, for example.

According to one embodiment, the monitor machine 102 relies on the use of a communication protocol to establish a monitored session between monitor machine 102 and one or more of the monitored machines 104, 106, and 108 for remote control, monitoring, and/or automatic session reconnect operations. For example, RDP offered with the WINDOWS® operating systems (available from Microsoft Corporation of Redmond, Wash.), provides a user with a graphical interface that can be used to connect to another computer over a network according to installed RDP client software and/or RDP server software. Other vendors offer remote desktop software according to the particular platform being deployed. Accordingly, particular remote desktop features and capabilities can vary based on operating system type and/or machine type.

RDP provides a multichannel protocol to convey presentation data, serial device communication, licensing information, highly encrypted data (keyboard, mouse activity), etc. RDP enables data compression, data encryption, and logon and logoff services. RDP communications are typically packaged or embedded within the TCP/IP protocol. Data to be communicated from an application or service are sent to protocol stacks, sectioned, directed to a channel, encrypted, wrapped, framed, packaged onto a network protocol, and/or addressed and sent over connections 116, 118, and 120 to the monitored machines 104, 106, and 108. The monitored machines 104, 106, and 108 work in reverse to strip the address from the packet, unwrap the data, decrypt the data, etc. so that the received data are available for use.

A monitored session may be associated with a single user and one corresponding monitored machine or the monitored session can be associated with different monitored machines and multiple users. For example, a WINDOWS® operating system based machine can use RDP to instantiate a monitored session that includes a secure connection between the monitor machine 102 and the monitored machines 104, 106, and/or 108. To activate or begin a monitored session, a user may be required to authenticate with user credentials or some other type of authorizing indicia. After authenticating, the monitor machine 102 of an embodiment uses a remote desktop application (e.g., RDP or another remote control protocol) to create the monitored session and connect one or more of the monitored machines 104, 106, and 108 to the monitored session.

According to one embodiment, the monitor machine 102 can use a session manager to monitor sessions, which may rely upon one or more protocol stacks to enable communication functions between monitor machine 102 and one or more of the monitored machines 104, 106, and 108. For example, a protocol stack may be used to manage communications of each monitored session according to remote desktop parameters and/or other protocol parameters such as TCP/IP, UDP, etc. The monitor machine 102 and the monitored machines 104, 106, and 108 can use application programming interfaces (APIs) and/or function calls with one or more protocol stacks as part of communicating during a monitored session.

Should a disruption to a monitored session occur (e.g., reboot, offline status, power disruption, unable to connect, etc.), the automated reconnect agent executable 110 of one embodiment uses automatic reconnect parameters 114 to automatically reconnect one or more of the monitored machines 104, 106, and 108 and/or re-instantiate a pre-existing monitored session. If the automated reconnect agent executable 110 is unable to re-instantiate the pre-existing monitored session, an electronic notification or an alert can be transmitted from one or more of the monitored machines 104, 106, and 108 to the monitor machine 102 or another component (local or remote) in real-time regarding the inability to reconnect and/or re-instantiate a pre-existing monitored session.

For example, once a disruption occurs that prevents machine to machine communication over a pre-existing monitored session, a monitored machine or other component can transmit an electronic message, such as an email or text message, for example, to the monitor machine 102 or other device/system (e.g., work tablet, mobile phone, pager, etc.) alerting an administrator to the lost session and/or any potential issues associated with the lost session from the state parameter (e.g., unreachable machine, bandwidth loss with lost session, etc.).

The electronic notification of one embodiment includes automatic reconnect parameters 114 and/or identification information (e.g., device/system ID, IP address, etc.) of one or more of the monitored machines 104, 106, and 108 (and/or monitor machine 102 for failover to a redundant machine) and/or a reason for a lost session. With the real-time notification, an administrator or other user may be able to readily correct the issue and/or perform diagnostics in order to restore a lost session and resume electronic transactions.

Figure 2:
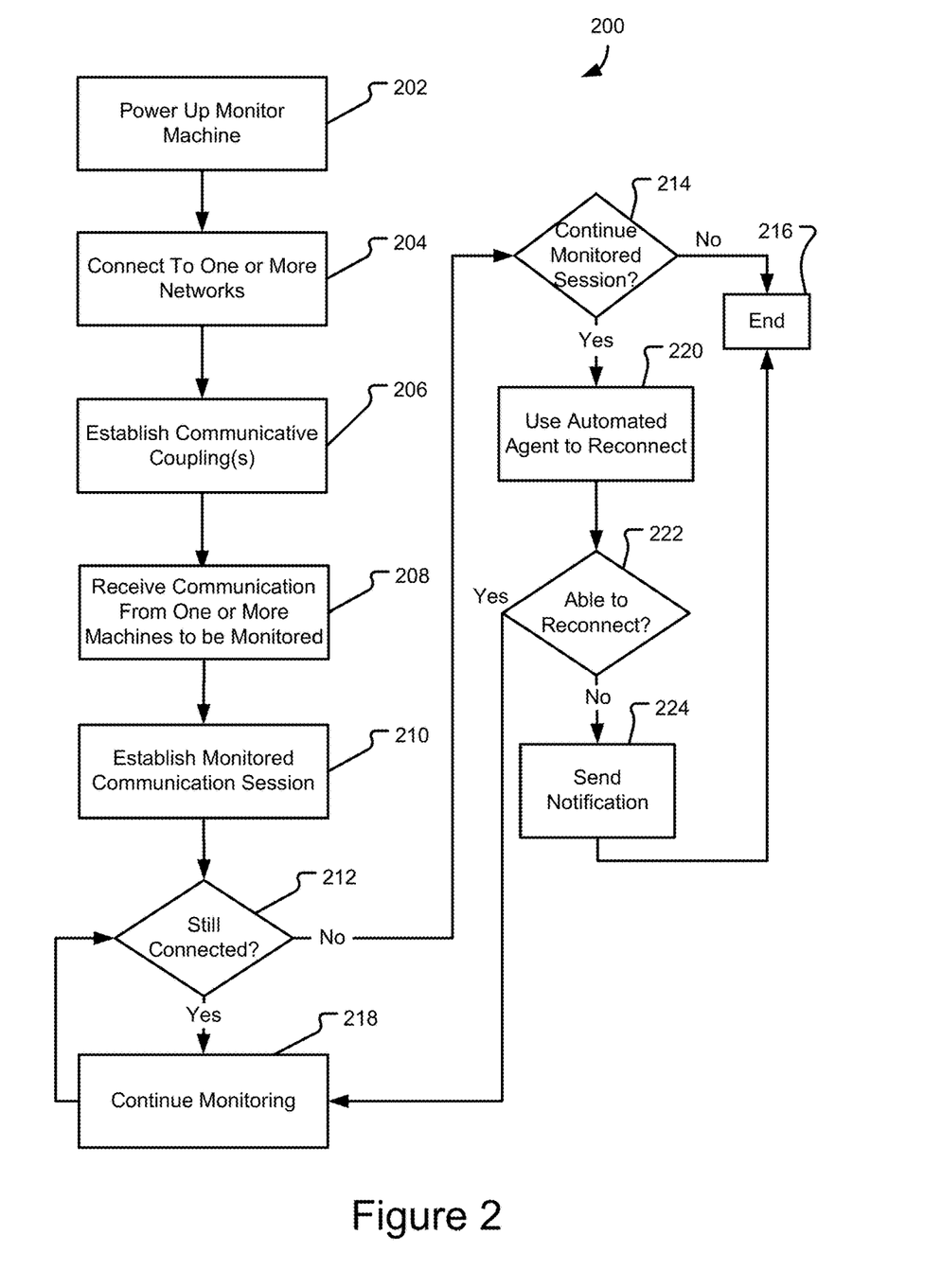
FIG. 2 is flow diagram that depicts a process of managing one or more communication sessions between communication systems and/or devices according to an embodiment.

FIG. 2 is flow diagram that depicts a process 200 of managing one or more communication sessions between communication systems and/or devices (e.g., machines) according to an embodiment. It will be appreciated that the process 200 is applicable to a plurality of monitored sessions that include multiple monitored machines, such as processor based systems and/or devices that perform the roles of server and/or client communicating via a computer or communication network (e.g., network(s) 112). With continuing reference to FIG. 2, the process 200 of an embodiment begins at 202 when a monitor machine (e.g., monitor machine 102) is powered up, for the first time or after a reboot, restart, sleep, power down, etc.

At 204, the process 200 establishes a network connection and connects to one or more networks (e.g., network(s) 112). At 206, the process 200 operates to establish one or more communicative couplings or connections with one or more machines to be monitored (e.g., machines 104, 106, and/or 108). At 208, the process 200 according to one embodiment, receives one or more electronic communications from one or more machines to be monitored. For example, the process 200 at 208 may rely on a monitor machine 102 or other component to receive an electronic eligibility request from an HIS machine requesting information about a particular patient account.

At 210, the process 200 of an embodiment operates to establish a monitored session in part by responding to the one or more communications from the one or more machines to be monitored by transmitting a configuration file or configuration data that includes automatic reconnect parameters and/or other remote control parameters associated with a monitored session between a monitor machine 102 and one or more monitored machines. In one embodiment, the process 200 at 210 sends code with or in addition to the configuration file pertaining to an automated reconnect agent executable 110 that operates to automatically reconnect to and re-instantiate a pre-existing monitored session.

In one embodiment, the process 200 transmits an automated reconnect agent executable 110 with an electronic transmission with or without including corresponding automatic reconnect parameters 114. As an example, in responding to an electronic eligibility request for information, the process 200 can operate to inject executable code and/or automatic reconnect parameters 114 into a message segment or code segment of an electronic eligibility response or other electronic transmission.

By transmitting the automated reconnect agent executable 110 and/or automatic reconnect parameters 114 at the start, before, or while setting up a monitored session, the process 200 operates to preempt issues that may later arise after a session disruption. For example, even though a session is disrupted or lost, processing, memory, and/or other resources may be tied up as part of an allocated channel (e.g., reduced bandwidth due to allocated channel but inactive session). Moreover, a channel allocated to a disrupted or lost session limits the number of channels that may be allocated or available for other systems and/or devices, applications, services, etc.

By reconnecting the monitored session or discontinuing a monitored session, channels may be freed up and allocated more efficiently. According to another implementation, the process 200 does not require receiving a communication (operation 208) before instantiating a monitored session; but may instead instantiate the monitored session by transmitting the automated reconnect agent executable 110 and/or automatic reconnect parameters 114 and/or other connection parameters as part of or with a configuration file or data to a machine to be monitored without or absent first receiving a communication from the machine to be monitored.

At 212, if the monitor machine 102 and one or more monitored machines are no longer connected or able to communicate, the process 200 proceeds to 214 to determine whether to attempt to reconnect to the monitored session. For example, the process 200 at 212 can rely on a heartbeat signal or other mechanism to determine when a communication channel is unavailable or unusable. At 214, the process 200 can determine that the monitored session may no longer be needed since all requested data have been received and/or transmitted and/or application services are complete. If it a monitored session is no longer needed at 214, the process 200 proceeds and ends at 216 by disconnecting.

However, at 212, if the monitor machine 102 and one or more monitored machines are still connected and/or able to communicate, the process 200 proceeds to 218 and continues to allow communications over the communication channel as part of the monitored session. If the process 200 at 214 attempts to continue the monitored session, the process 200 continues to 220 where an automated reconnect agent executable 110 operates to use automatic reconnect parameters 114 to reconnect to and re-instantiate the monitored session.

If unable to reconnect to the monitored session at 222, the process 200 proceeds to 224 and operates to send an electronic notification to the monitor machine 102 and/or other component and/or recipient to inform that the monitored machine was unable to automatically reconnect to the pre-existing monitored session and ends at 216. For example, the reconnect attempt count parameter described above can be used to determine when to disconnect from and/or terminate a monitored session and/or send an electronic notification regarding an inability to reconnect or reestablish a session at 224. If the monitored session is to be terminated, the process 200 operates to identify the appropriate monitored session to terminate and ends at 216.

Figure 3:
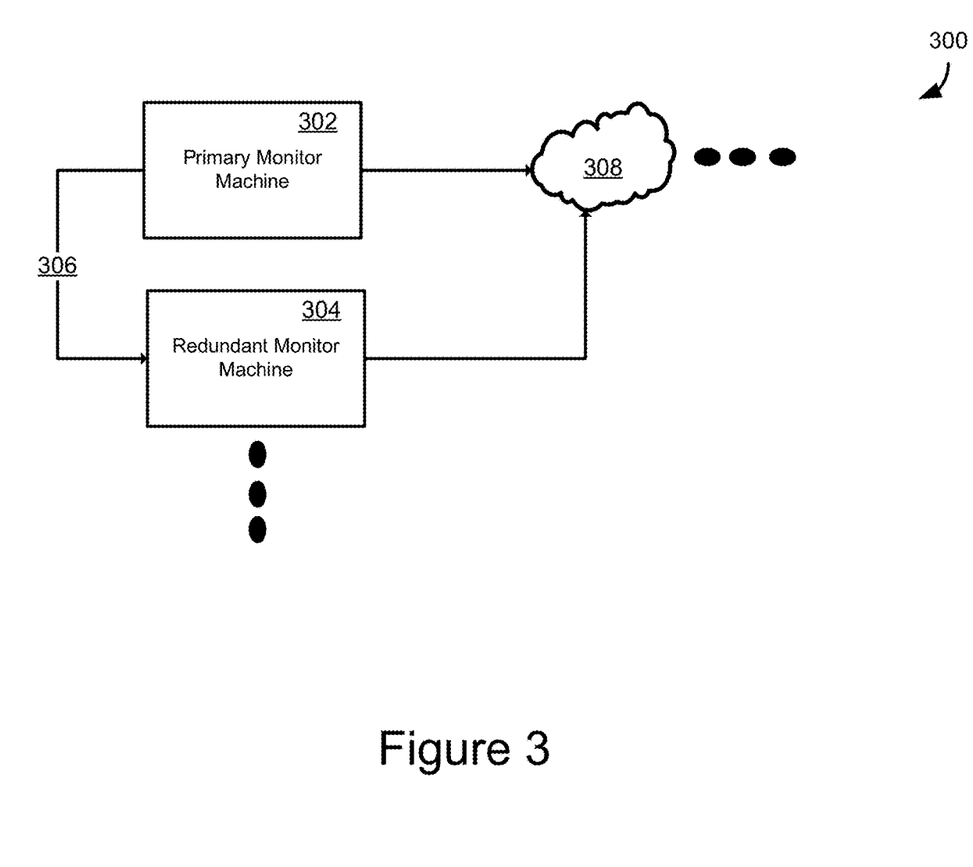
FIG. 3 is a block diagram that depicts a high-level view of a computer and communication system according to an embodiment.

FIG. 3 is a block diagram that depicts a high-level view of a computer and communication system 300 (system 300) according to an embodiment. One or more monitored machines have not been illustrated in FIG. 3 to simplify the description. However, the description of the monitored machines and/or monitored sessions above in conjunction with FIG. 1 and FIG. 2 are applicable to system 300.

As shown in FIG. 3, the system 300 includes a primary monitor machine 302 coupled to a secondary monitor machine 304 via direct connection 306 and/or network(s) 308, but is not so limited. According to such an embodiment, the secondary monitor machine 304 is used to monitor the primary monitor machine 302 (or vice versa) whether as part of a monitored session or other communication configuration. Depending on the scale of the system 300, it will be appreciated that a third, fourth, or other number of redundant monitor machines can be deployed to further fortify and enhance the integrity of the system 300.

According to an embodiment, a remote control application, such as RDP for example, can be used to instantiate a monitored session between redundant monitor machines, such as the primary monitor machine 302 and secondary monitor machine 304. For example, the secondary monitor machine 304 can include a remote desktop launch interface that provides a means to set up a monitored session between the primary monitor machine 302 and the secondary monitor machine 304.

If an event causes a disruption or malfunction in the operation of the primary monitor machine 302, the secondary monitor machine 304 or another networked machine can be used to take over or assume the role of the primary monitor machine 302 and monitor session connections with one or more monitored machines. As described above, additional monitor machines can be deployed. For example, a third monitor machine may be used to monitor the secondary monitor machine 304 until the primary monitor machine 302 comes back online. Additionally, more than one redundant monitor machine may be deployed for each monitor machine according to another deployment implementation.

Figure 4:
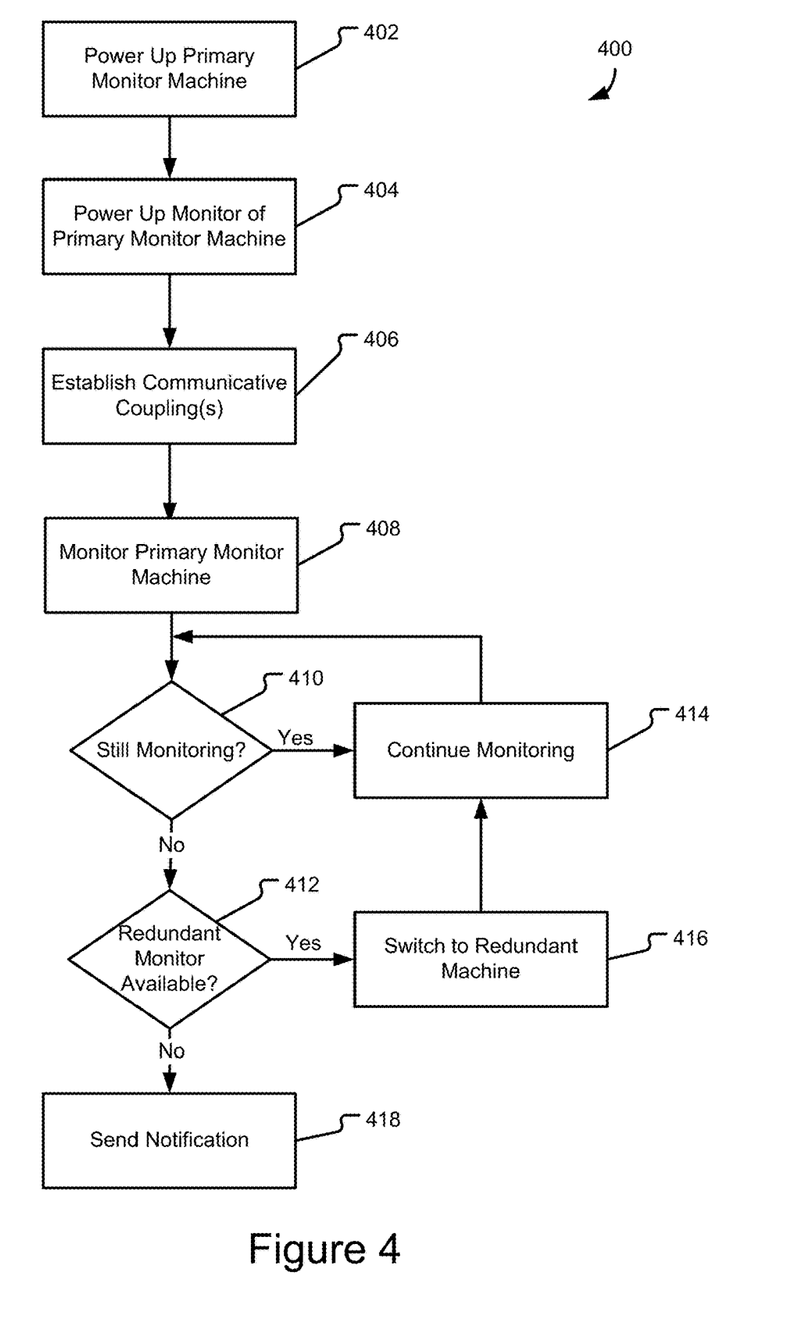
FIG. 4 is a flow diagram that depicts a process of deploying a redundant machine monitor in conjunction with a machine monitor being used to manage one or more monitored sessions according to an embodiment.

FIG. 4 is a flow diagram that depicts a process 400 of deploying a redundant machine monitor in conjunction with a machine monitor being used to manage one or more monitored sessions according to an embodiment. The process 400 is applicable to a plurality of monitored sessions that include multiple monitored machines and/or communication channels, such as processor based systems and/or devices that perform the roles of server and/or client communicating via a computer or communication network.

With continuing reference to FIG. 4, the process 400 of an embodiment begins at 402 when a first monitor machine (e.g., primary monitor machine 302) is powered up (for the first time or after reboot, restart, sleep, power down, etc.) and connects to one or more networks (e.g., network(s) 308). At 404, the process 400 continues as a second monitor machine (e.g., second monitor machine 304) is powered up and connects to one or more networks (e.g., network(s) 308).

At 406, the process 400 operates to establish one or more communicative couplings or connections between the first and second monitor machines and/or with one or more machines to be monitored (e.g., machines 104, 106, and/or 108). As part of 406, the process 400 of an embodiment establishes a monitored session with one or more machines to be monitored before instantiating the monitoring relationship between the first and second monitor machines.

At 408, the process 400 uses the second monitoring machine to monitor the operation of the first monitoring machine while the first monitor machine monitors one or more other monitored machines. As one example, the process 400 can use RDP at 408 to establish a monitored session between the first and second monitor machines, as described above. As part of the instantiation of a monitored session, the second machine can transmit a configuration file that includes automatic reconnect parameters 114 and/or other remote desktop parameters associated with the monitored session to the first monitor machine and/or one or more other monitored machines.

By also transmitting the automatic reconnect parameters 114 and/or other remote control and/or reconnect parameters to the second monitor machine, if the first monitor machine becomes inoperable or otherwise non-communicative, the monitored session(s) can quickly be restored using the second machine monitor since the one or more monitored machines already have the information needed to automatically reconnect to the monitored session(s) with the second monitor machine.

If the first monitor machine is monitoring at 410, the process 400 at 414 continues to use the first monitor machine as the primary monitor machine for the monitored session(s) until monitoring is no longer necessary or required. However, if the first monitor machine is no longer monitoring the monitored session(s) (e.g., inoperable or otherwise non-communicative) at 410 and a redundant monitor machine is available at 412, the process 400 operates at 416 to switch to the second monitor machine or another monitor machine to monitor the monitored session(s) and/or second machine monitor. In one embodiment, a hardware switch, such a switching circuit for example, can be used to perform the switching operations between monitor machines and/or monitored machines.

If the first monitor machine is no longer monitoring the monitored session(s) at 410 and a redundant monitor machine is not available at 412, the process 400 operates at 418 to send a notification or alert to a system administrator associated with the first monitor machine and/or one or more monitored machines regarding the inability to re-instantiate a pre-existing monitored session. It will be appreciated that the process 400 can be configured to transmit the automated reconnect parameters at the start, before, or while setting up a monitored session to preempt issues that may later arise that disrupt one or more monitored session(s) or other electronic transactions.

Figure 5:
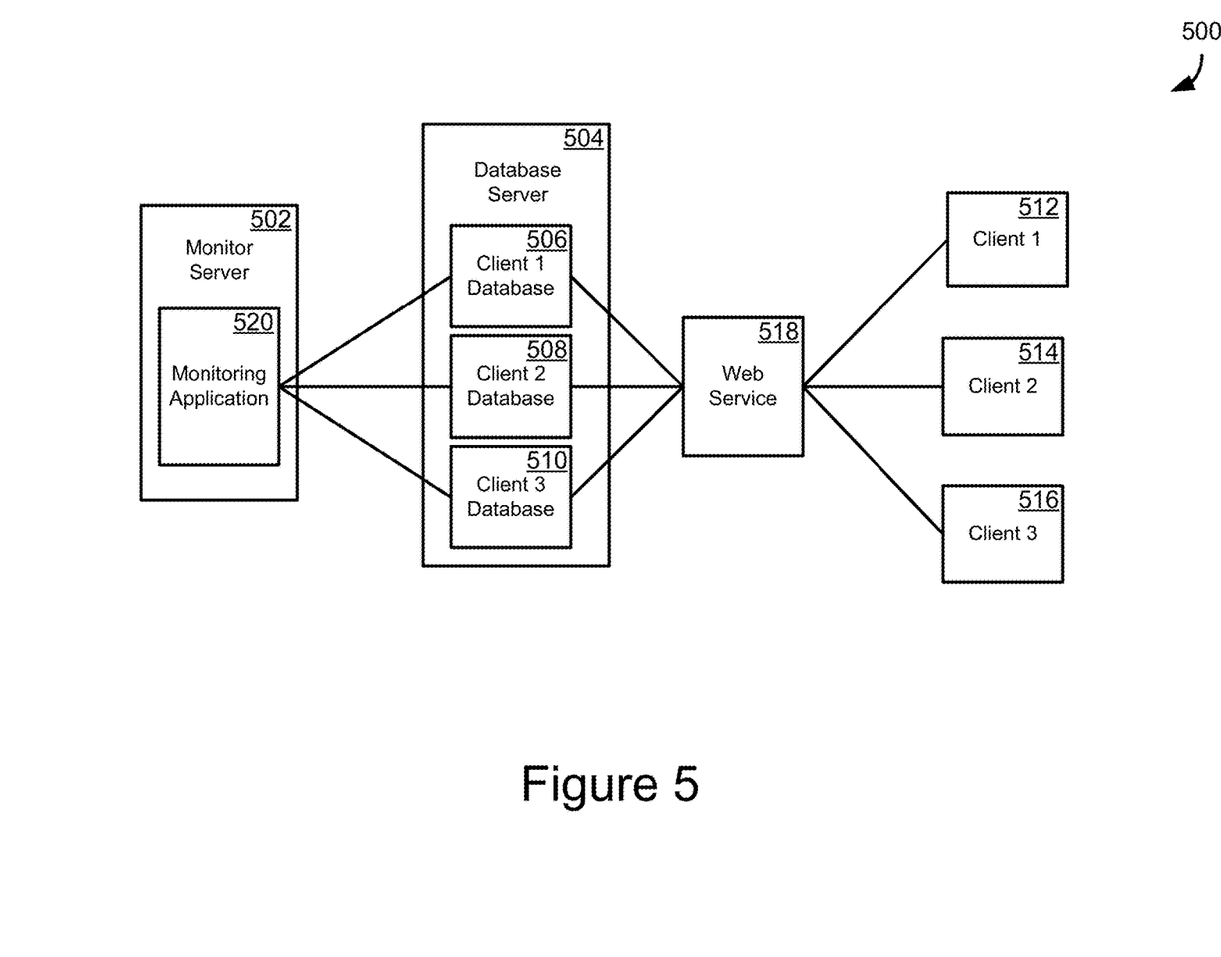
FIG. 5 is a block diagram that depicts a remote monitoring system according to an embodiment.

FIG. 5 is a block diagram that depicts an exemplary remote monitoring system 500 (system 500) according to an embodiment. As shown in the example of FIG. 5, the system 500 includes a monitor server 502 in communication with a database server 504. For the illustrated example, database server 504 includes a plurality of client databases 506, 508, and 510, but is not so limited. Each of the client databases 506, 508, and 510 holds information particular to each client 512, 514, and 516.

The stored information in client database 506 can be used to allow client 512 to automatically reconnect and/or re-instantiate a monitored session with monitor server 502 without or absent human intervention. Likewise, client databases 508 and 510 store information which allows clients 514 and 516 to automatically reconnect and/or re-instantiate a monitored session with monitor server 502 without or absent human intervention, respectively. Web service 518, which can include one or more additional server machines, is configured to enable communication between clients 512, 514, and 516, and the respective client databases 506, 508, and 510 included with the database server 504.

As shown, the monitor server 502 of an embodiment includes a monitoring application 520 comprising complex programming instructions that, when executed, operate in part to monitor communications from each client 512, 514, and 516. The monitoring application 520 of one embodiment operates to receive communications from each client 512, 514, and 516 in the form of text commands to raise necessary events to trigger an action associated with an existing or to be established monitored session.

As described above, each client 512, 514, and 516 (e.g., designated application(s) being monitored) can use existing or to be developed remote desktop technologies to issue command messages to the web service 518 for the monitoring application 520. Each client 512, 514, and 516 can be outfitted with a user interface element or control (e.g., a displayed button, interactive or dropdown menu, or other displayed electronic interface element) to enable command messages to be transmitted to the web service 518 for the monitoring application 520. The web service 518 is configured to receive command messages from each client 512, 514, and 516 and write the messages to the corresponding client database 506, 508, and 510 of the database server 504 (e.g., structured query language (SQL) database server) for the monitoring application 520.

As an illustrative example, a developer may need to perform maintenance on a client server associated with client 512. Before beginning the maintenance service, the developer or other user can use a displayed control interface to take control of the client 512 and send a command message to the monitoring application 520 to discontinue or pause monitoring operations. As one example, the developer can click or tap on a displayed control interface element associated with the client 512 to submit a command to stop monitoring operations (e.g., click or tap a STOP MONITORING button). The developer can also use the displayed control interface to send a command to resume monitoring operations (e.g., click or tap a RESUME MONITORING button). It will be appreciated that the command interface associated with each client 512, 514, and 516 can be integrated with an existing remote desktop technology application running on the corresponding client or included as an add-in feature with each client 512, 514, and 516.

Continuing this example, the monitoring application 520 polls the database 506 for the command message and is able to determine that client 512 issued the command along with the identity of the server machine running the client 512. For example, the monitoring application 520 can use automatic reconnect parameters 114 as described above to identify the client and/or server machine associated with each received command message. After or upon receiving a command message, the monitoring application 520 executes an action conforming to the command message.

For example, according to the type of command message received, the monitoring application 520 can take a corresponding action, such as "Stop Monitoring", "Resume Monitoring", "Start Monitoring", etc. As discussed above, each client 512, 514, and 516 can be configured with one or more interactive command interface elements or buttons that allow corresponding messages to be sent for use by the monitoring application 520 (e.g., "Stop Monitoring", "Resume Monitoring", "Start Monitoring", etc.). Accordingly, each command message triggers a corresponding action by the monitoring application 520.

According to one embodiment, the monitoring application 520 operates in part to poll client databases 504, 506, and 508 on a configurable interval or schedule looking for command messages to process. After or upon finding one or more command messages, the monitoring application 520 can send one or more response messages (e.g., ACK/NAK) to a corresponding client regarding the status of a particular command message and/or take a specified action based on a particular command message ("Stop Monitoring", "Resume Monitoring", "Start Monitoring", etc.). Exemplary command messages are issued as command messages that include textual strings.

It will be appreciated that integration of the various components of system 500 can be configured according to wired and/or wireless configurations as well as various data communication protocols. It will be appreciated that the remote monitoring and restoration processes are necessarily rooted in computer and networking technologies and require a technical solution, such as the various embodiments and examples described in detail above.

Figure 6:
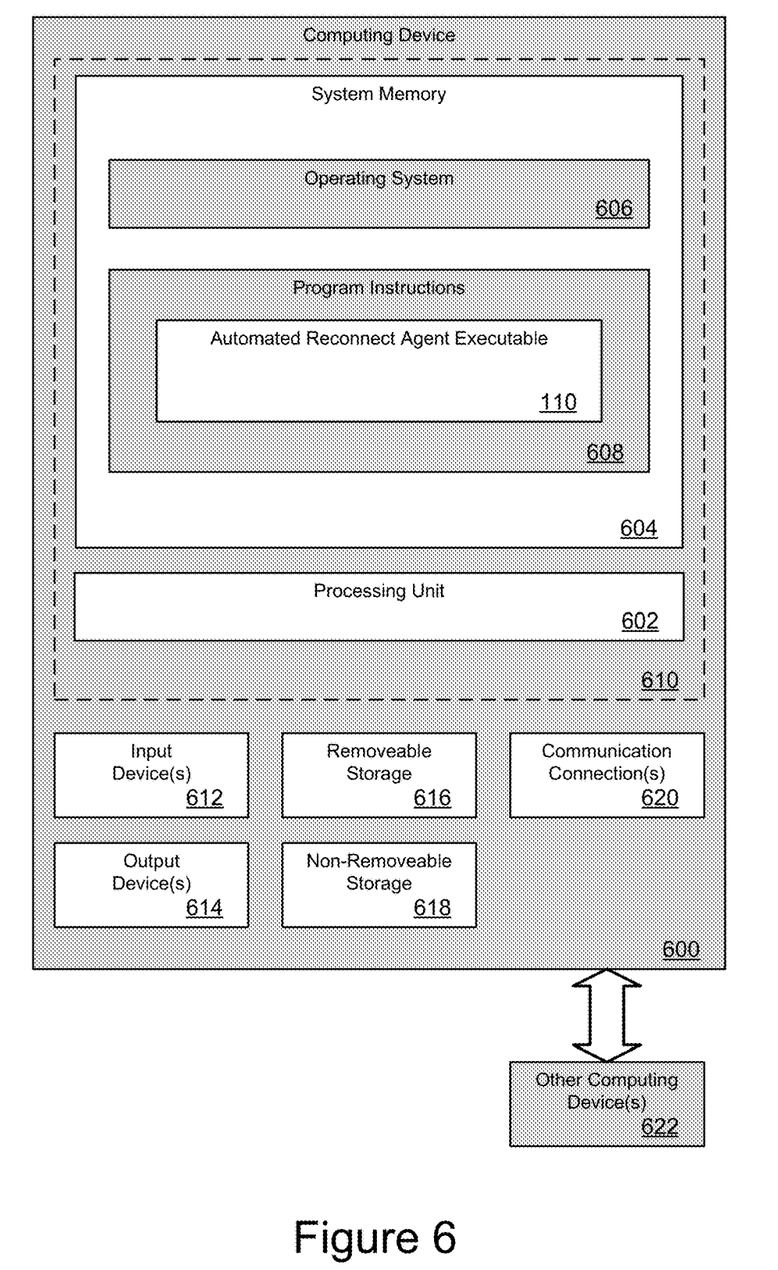
FIG. 6 is a block diagram illustrating physical components of an example computing device with which aspects may be practiced.

FIG. 6 is a block diagram illustrating physical components of an example computing device 600 with which aspects may be practiced. The computing device 600 may include at least one processing unit 602 and a system memory 604. The system memory 604 may comprise, but is not limited to, volatile (e.g. random access memory (RAM)), non-volatile (e.g. read-only memory (ROM)), flash memory, or any combination thereof. System memory 604 may include operating system 606, one or more program instructions 608, and may include remote control functionality including an automated reconnect agent executable 110, having sufficient computer-executable instructions, which when executed, perform functionalities and features as described herein. Operating system 606, for example, may be suitable for controlling the operation of computing device 600 and for instantiating a communication session between one or more local or remote systems/devices. Furthermore, aspects may be practiced in conjunction with a graphics library, other operating systems, or any other application program and is not limited to any particular application or system. This basic configuration is illustrated by those components within a dashed line 610. Computing device 600 may also include one or more input device(s) 612 (keyboard, mouse, pen, touch input device, etc.) and one or more output device(s) 614 (e.g., display, speakers, a printer, etc.).

The computing device 600 may also include additional data storage devices (removable or non-removable) such as, for example, magnetic disks, optical disks, or tape. Such additional storage is illustrated by a removable storage 616 and a non-removable storage 618. Computing device 600 may also contain a communication connection 620 that may allow computing device 600 to communicate with other computing devices 622, such as over a network in a distributed computing environment, for example, an intranet or the Internet. Communication connection 620 is one example of a communication medium, via which computer-readable transmission media (i.e., signals) may be propagated.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media does not include computer-readable transmission media.

Aspects described herein may be used in various distributed computing environments where tasks are performed by remote processing devices that are linked through a communications network. Aspects described herein may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 600 or any other computing devices 622, in combination with computing device 600, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

I claim:

1. A computer system comprising:
   a power supply;
   a network interface;
   memory; and
   a processor operable to:
   power up the computer system via the power supply;
   establish a communicative coupling for a monitored session with one or more monitoring computer systems and/or devices via the network interface;
   receive an automated reconnect agent executable to use to automatically reestablish the monitored session after a communication disruption with the one or more monitoring computer systems and/or devices;
   receive automated reconnect parameters for the monitored session to use with the automated reconnect agent executable to automatically reestablish the monitored session after the communication disruption with the one or more monitoring computer systems and/or devices; and
   automatically attempt to reestablish the monitored session after the communication disruption with the one or more monitoring computer systems and/or devices that includes transmission of a reconnect communication from the automated reconnect agent executable that uses the automated reconnect parameters to re-instantiate the monitored session with the one or more monitoring computer systems and/or devices without requiring re-authentication.

2. The computer system of claim 1, further comprising a communication coupling with a redundant monitor computer system and/or device.

3. The computer system of claim 1, further operable to transmit an electronic notification if unable to automatically reestablish the monitored session.

4. The computer system of claim 1, further operable to save a session state of the monitored session before the communication disruption.

5. The computer system of claim 1, further operable to receive an electronic response string to reconnect without requiring a user to re-login or otherwise re-authenticate.

6. The computer system of claim 1, further operable to receive the automated reconnect parameters with a configuration file.

7. The computer system of claim 1, wherein the automated reconnect parameters comprise one or more of a monitored session identifier (ID) parameter to identify the monitored session, a server name parameter to identify a monitored session host, a connect parameter to track connection settings of the monitored session, a reconnect attempt count parameter to track a number of reconnect attempts, and/or a state parameter to track state information associated with the monitored session.

8. The computer system of claim 7, wherein the reconnect attempt count parameter enables a determination of when to disconnect from the monitored session.

9. The computer system of claim 7, wherein the state parameter is populated based on one or more of a last completed transaction, an output from a power regulation circuit, and/or an output from the network interface.

10. The computer system of claim 1, further operable to receive the automatic reconnect parameters as part of a message segment or code segment of an electronic transmission.

11. A method comprising:
    establishing a communicative coupling for a monitored session with one or more monitoring computer systems and/or devices via a network interface;
    receiving an automated reconnect agent executable to use to automatically reestablish the monitored session after a communication disruption with the one or more monitoring computer systems and/or devices;
    receiving automated reconnect parameters for the monitored session to use with the automated reconnect agent executable to automatically reestablish the monitored session after the communication disruption with the one or more monitoring computer systems and/or devices; and
    automatically attempting to reestablish the monitored session after the communication disruption with the one or more monitoring computer systems and/or devices including transmitting a reconnect communication from the automated reconnect agent executable that uses the automated reconnect parameters to re-instantiate the monitored session with the one or more monitoring computer systems and/or devices without requiring re-authentication.

12. The method of claim 11, further comprising transmitting an electronic notification if automatic reconnect is not possible.

13. The method of claim 11, further comprising saving a session state of the monitored session.

14. The method of claim 11, further comprising receiving an electronic response string to reconnect without requiring a user to re-login or otherwise re-authenticate.

15. The method of claim 11, further comprising receiving the automated reconnect parameters with a configuration file.

16. The method of claim 11, wherein the automated reconnect parameters comprise one or more of a monitored session identifier (ID) parameter to identify the monitored session, a server name parameter to identify a monitored session host, a connect parameter to track connection settings of the monitored session, a reconnect attempt count parameter to track a number of reconnect attempts, and/or a state parameter to track state information associated with the monitored session.

17. The method of claim 16, wherein the reconnect attempt count parameter enables a determination of when to disconnect from the monitored session.

18. The method of claim 16, wherein the state parameter is populated based on one or more of a last completed transaction, an output from a power regulation circuit, and/or an output from the network interface.

19. The method of claim 11, further comprising receiving the automatic reconnect parameters as part of a message segment or code segment of an electronic transmission.

20. A non-transitory computer readable medium that includes executable instructions that, when executed, enable recovery of a monitored session by:
    establishing a communicative coupling for the monitored session with a remote computer system;
    transmitting an automated reconnect agent executable to the remote computer system to use to automatically reestablish the monitored session after a communication disruption of the monitored session;
    transmitting automated reconnect parameters for the monitored session to the remote computer system to use with the automated reconnect agent executable to automatically reestablish the monitored session after the communication disruption; and
    automatically attempting to reestablish the monitored session after the communication disruption including receiving a reconnect communication from the automated reconnect agent executable executing on the remote computer system and applying the automated reconnect parameters to re-instantiate the monitored session without requiring re-authentication.

* * * * *